(12) United States Patent
Stapleton

(10) Patent No.: US 12,470,403 B2
(45) Date of Patent: Nov. 11, 2025

(54) BROWSER AUTHENTICATION OF SERVER PUBLIC KEY CERTIFICATE (BAS-PKC)

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 322 days.

(21) Appl. No.: 18/216,283

(22) Filed: Jun. 29, 2023

(65) Prior Publication Data

US 2025/0007732 A1  Jan. 2, 2025

(51) Int. Cl.
*H04L 9/32* (2006.01)
*H04L 67/02* (2022.01)
*H04L 9/08* (2006.01)
*H04L 9/40* (2022.01)

(52) U.S. Cl.
CPC ............. *H04L 9/3263* (2013.01); *H04L 9/32* (2013.01); *H04L 9/3236* (2013.01); *H04L 67/02* (2013.01); *H04L 9/0822* (2013.01); *H04L 9/0869* (2013.01); *H04L 63/062* (2013.01)

(58) Field of Classification Search
None
See application file for complete search history.

(56) References Cited

U.S. PATENT DOCUMENTS

| | | | |
|---|---|---|---|
| 9,787,477 B1* | 10/2017 | Singal | H04L 9/3265 |
| 11,206,135 B2* | 12/2021 | Gray | H04L 9/0825 |
| 2015/0341178 A1* | 11/2015 | Tanaka | H04L 9/0822 713/156 |
| 2017/0359185 A1* | 12/2017 | Hang | H04L 67/02 |
| 2019/0052632 A1* | 2/2019 | Takagi | H04L 9/3271 |
| 2020/0028699 A1* | 1/2020 | Sharifi Mehr | H04L 9/14 |
| 2021/0067347 A1* | 3/2021 | Yu | H04L 9/3247 |
| 2025/0080322 A1* | 3/2025 | Kambayashi | H04L 9/3213 |
| 2025/0097052 A1* | 3/2025 | Dietrich | H04L 63/045 |

* cited by examiner

*Primary Examiner* — Lashonda Jacobs-Burton
(74) *Attorney, Agent, or Firm* — Foley & Lardner LLP

(57) ABSTRACT

The arrangements disclosed herein relate to systems, apparatus, methods, and non-transitory computer readable media for determining, by a browser, data cipher by encrypting data using a first encryption key, the first encryption key is generated using a first random number, a second random number, and a third random number. The browser sends to a server, the data cipher. The browser determines a key cipher by encrypting the third random number using a certificate of the server. The browser sends to the server the key cipher.

20 Claims, 5 Drawing Sheets

BROWSER AUTHENTICATION OF SERVER PUBLIC KEY CERTIFICATE (BAS-PKC)

BACKGROUND

Transport Layer Security (TLS) is a point-to-point communication protocol based on which communications between a browser and a server can be performed. The browser and the server can establish a TLS connection by establishing session encryption and integrity keys in a TLS handshake. Then, the browser and the server can exchange encrypted data packets using the established session encryption and integrity keys. For example, a browser can encrypt data packets using session keys established during the TLS handshake, and the server can decrypt the data packets using the same session keys. Accordingly, TLS can protect the data packet for data-in-motion using encryption and integrity checking.

However, the browser may not be directly communicating with the server. The TLS connection may not terminate at the server but at an intermediate endpoint. There can be many alternate TLS paths that are transparent to the browser and/or to the server. For example, the browser can establish a TLS connection with a network device (e.g., a load balancer) located in a Demilitarized Zone (DMZ) where the data received from the browser is decrypted. A second connection established between the network device and the actual server but note that the second connection might be a separate TLS session/connection or a cleartext session/connection.

In another example, the browser can establish a TLS connection with an infrastructure device (e.g., TLS Monitor) where the data from the browser is decrypted for inbound malware control or outbound Data Loss Prevention (DLP) control. A second connection is established between the infrastructure device and the actual server, typically another TLS session/connection. In some examples, for TLS monitoring, the communication "pipe" is "bent: to allow decryption and inspection.

Transmission of sensitive data from a browser to a server can be problematic. In the examples in which TLS connection terminates within the DMZ or the infrastructure device, sensitive data is exposed to threats internal to a system including the server, the network device, and the infrastructure device, as well as threats external to the system.

SUMMARY

The arrangements disclosed herein relate to systems, methods, non-transitory computer-readable media, and apparatuses for receiving, by a browser from a first server, a certificate of the first server and a first random number, sending, by the browser to a second server, a second random number, receiving, by the browser from the second server, a first hash value generated by the second server using the first random number, the second random number, and the certificate, determining, by the browser, a second hash value using the first random number, the second random number, and the certificate; and performing, by the browser, communication with the first server in response to determining that the first hash value and the second hash value are the same.

The arrangements disclosed herein relate to systems, methods, non-transitory computer-readable media, and apparatuses for determining, by a browser, data cipher by encrypting data using a first encryption key, the first encryption key is generated using a first random number, a second random number, and a third random number, sending, by the browser to a server, the data cipher, determining, by the browser, a key cipher by encrypting the third random number using a certificate of the server, and sending, by the browser to the server, the key cipher.

The arrangements disclosed herein relate to systems, methods, non-transitory computer-readable media, and apparatuses for receiving, by a server from a browser, a data cipher and a key cipher, wherein the data cipher is generated by the browser by encrypting data using a first encryption key, the first encryption key is determined using a first random number, a second random number, and a third random number, and the key cipher is generated by the browser using a certificate of the server, determining, by the server, the third random number by decrypting the key cipher, determining, by the server, the first encryption key using the first random number, the second random number, and the third random number, and determining, by the server, the data by decrypting the data cipher using the first encryption key.

These and other features, together with the organization and manner of operation thereof, will become apparent from the following detailed description when taken in conjunction with the accompanying drawings.

DETAILED DESCRIPTION

Figure 1:
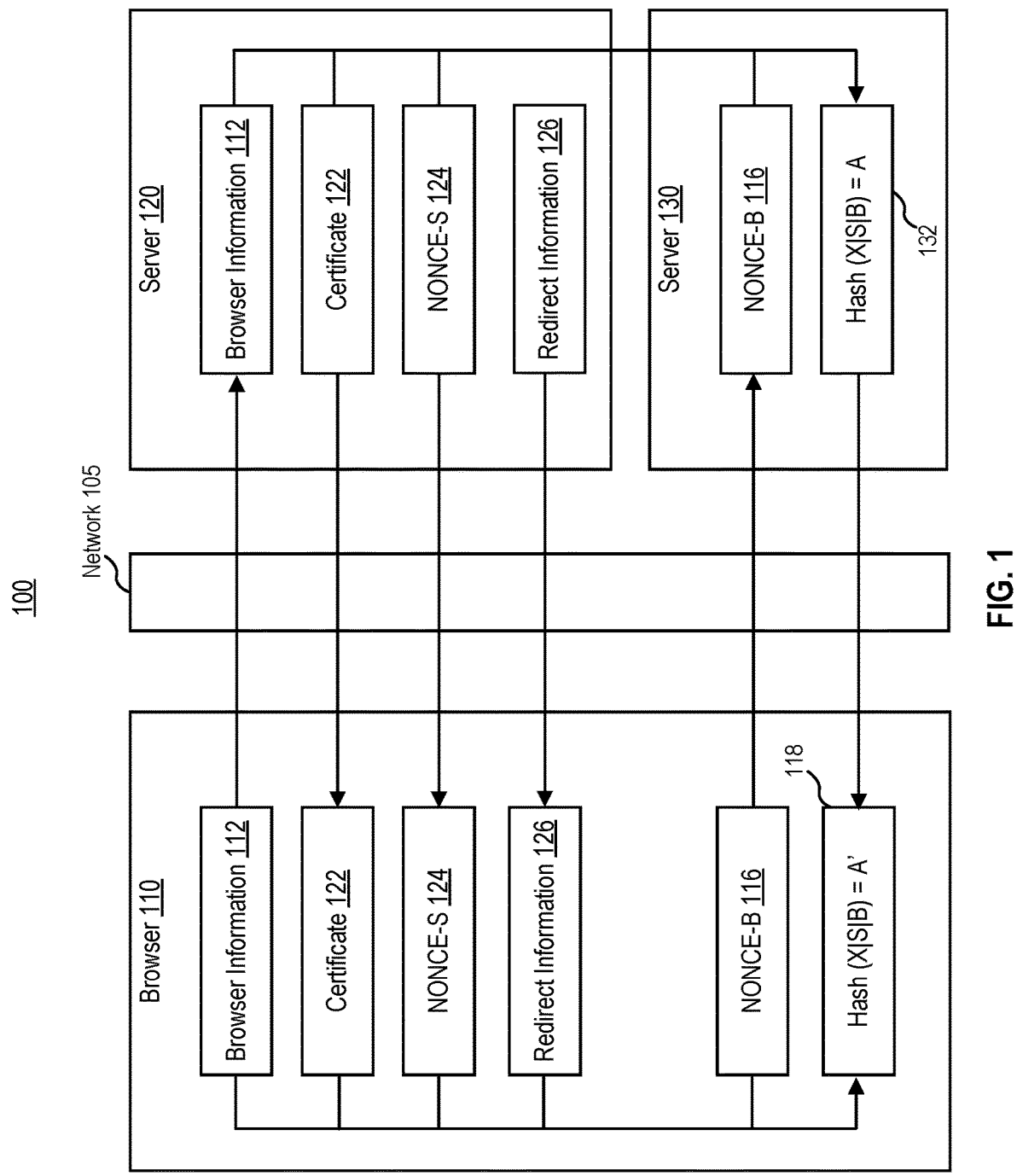
FIG. 1 is a schematic diagram illustrating an example method for establishing communication between a browser and a server, according to various arrangements.

Conventionally, for the TLS protocol, in response to the browser receiving the server TLS certificate, the browser performs certificate validation. Certificate validation includes tracing the server certificate pedigree from the issuing Certificate Authority (CA) certificate to the root CA certificate and identifying the complete certificate chain. The browser validates each certificate in the certificate chain, checking the expiration date, status (e.g., revocation status), cryptographic algorithms, and so on. The server certificate's signature is verified using the issuing CA public key certificate, and so on. Once certificate validation is completed, the browser can trust the server certificate for the TLS Handshake.

In some deployment scenarios, certificate validation functions may not be accessible to a computing system or software/firmware/applications provided thereon. For example, certificate validation functions may not accessible to a browser, e.g., browser script (e.g., Java script) downloaded by the browser from the server. For example, Java tools do not offer a certificate validation Application Programming Interface (API). Hence, if the server provides a dedicated public key certificate to the browser for protecting the sensitive data, certificate validation would need to be done within the Java script. However, developing a certificate validation routine requires significant resources, especially considering error handling. Further, the Java script cannot rely on the server TLS public key certificate, as it is likely that the server does not control the corresponding private key due to the numerous alternate TLS paths.

Conventionally, browser script (e.g., Java script) needs to authenticate the server so that the script can encrypt sensitive data that can be authenticated and decrypted by the server. This can be done using asymmetric cryptography whereby the browser script can use the server public key to establish a symmetric encryption key used to encrypt the sensitive data. An example cryptography method includes Rivest, Shamir, Adleman (RSA) encryption of a random Advanced Encryption Standard (AES) key which is used to encrypt the sensitive data.

However, the distribution method of the RSA public key to the browser needs to provide a reasonable level of assurance that the public key belongs to the server such that the server has control over the corresponding private key and that there is no Man-In-The-Middle (MITM) masquerading as the server.

The server can provide its public key certificate (e.g., the X.509 public key certificate) to the browser with appropriate controls such that the certificate is always valid. The server always checks or sets that its certificate is not expired, is not revoked, and so on before the server sends the public key certificate to the browser. The browser uses only the proffered certificate once per session and never stores the certificate on the local machine running the browser. Thus, some of the normal certificate validation processes can be abbreviated without sacrificing security controls.

The server needs to authenticate the browser so that the server can decrypt sensitive data with a reasonable level of assurance that the browser script performed the data encryption and that there is no MITM masquerading as the browser.

Due to network infrastructures and information security controls can change without notice to a server application team, sensitive data is encrypted using a separate cryptographic scheme, independent of the communication transport protocol (e.g., TLS). The encrypted sensitive data may be encapsulated within the data packet that is further encrypted via TLS. The arrangements disclosed herein relate to systems, apparatuses, methods, and non-transitory computer-readable media for delivering a public key certificate from a server to a browser. The browser can encrypt sensitive data using the public key certificate and sends the encrypted sensitive data to the server, independent of the transport connection. The arrangements disclosed herein provide end-to-end protection of sensitive data such as a password, other authentication credentials, authorization tokens, and so on.

One or more servers can deliver the public key certificate to the browser to deter MITM attacks. The browser (e.g., a script thereof) can authenticate the public key certificate without the browser script capability of performing certificate validation. The browser can deliver encrypted sensitive data to the server. The server authenticates the encrypted sensitive data without browser script capability of digital signatures or browser public key certificate.

FIG. 1 is a schematic diagram illustrating an example method 100 for establishing communication between a browser 110 and a server 120, according to various arrangements. The method 100 can be performed by the browser 110 (e.g., a browser script), the server 120, and the server 130, over a network 105. The browser 110 refers to software or application executed on a suitable computing system such as a mobile device, a smartphone, a laptop computer, a tablet, a desktop computer, a Point of Sale (POS) device, an Automatic Teller Machine (ATM), a kiosk, a customer interaction device, and the like. The browser 110 is controlled by browser script (e.g., Java script, ASP, JSP, VBScrupt, and so on). The browser 110 can access information from the server 120. For example, the browser 110 can send data to or receive data from the server 120, after establishing communication channel with the server 120. The browser 110 can send data to the server 120 or receive data from the server 120 for another application running on the same computing system or another computing system. While browser 110 is use as an example throughout, the arrangements disclosed herein can be likewise implemented for any computing systems, devices, applications, software, and firmware that lack certificate validation functionalities. Examples of each of the servers 120 and 130 include a computing system, a computer, a database, a computing cluster, cloud computing, and so on. In some examples, the servers 120 and 130 run on separate physical hardware. In some examples, the servers 120 and 130 can be separate virtual machines running using the same physical hardware.

The network 105 is any suitable Local Area Network (LAN), Wide Area Network (WAN), or a combination thereof. For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 150 is structured to permit the exchange of data, values, instructions, messages, and the like.

The browser 110 connects to the server 120 over the network 105, for example, over a Hypertext Transfer Protocol Secure (HTTPS) session using TLS. The TLS connection provides point-to-point server authentication to the browser 110. In the example in which TLS client authentication is used, the connection between the browser 110 to the server 120 can provide point-to-point client authentication to the server 120.

The browser 110 sends to the server browser information 112 used to identify the browser 110 or the computing system running the browser 110. In some examples, the browser information 112 includes one or more of an Identifier (ID) for the browser 110, and ID for the computing system (e.g., a device ID, International Mobile Equipment Identity (IMEI), a serial number, and so on)) running the browser 110, and so on. In some examples, the browser information 112 includes a browser profile that includes one or more of the ID of the browser 110, the ID of the computing system running the browser 110, and other information about the browser 110 and the computing system such as other applications running on the computing system, the Operating System (OS), and so on. The browser information 112 can be used to recognize the browser 112.

In response to receiving the browser information 112 over the network 105, the server 120 sends its certificate 122 to the browser 110, such as a public key certificate (e.g., an X.509 certificate), for protecting sensitive data communicated between the browser 110 and the server 120.

In response to receiving the browser information 112 over the network 105, the server 120 sends to the browser 110 a random number such as a Random Number Used Once (NONCE-S) 124 over the network 105. In some examples, NONCE-S 124 is generated by the server 120. In some examples, in response to receiving the browser information 112, the server 120 sends to the browser 110 redirect information 126 to browser 110 over the network 105. The redirect information 126 includes an identity of another server (e.g., server 130) to deter MITM. The redirect information 126 can include an ID of the server 130, such as one or more of an address (e.g., a network address) of the server 130, a device ID, a Uniform Resource Locator (URL), a Uniform Resource Identifier (URI), or a Uniform Resource Name (URN) of the server 130, and so on. The browser information 112, the certificate 122, the NONCE-S 124, and the redirection information 126 can be exchanged by the browser 110 and the server 120 over the network 105.

In response to receiving one or more of the certificate 122, the NONCE-S 124, or the redirect information 126, the browser 110 sends to the server 130 NONCE-B 116. In some examples, NONCE-B 116 is generated by the browser 110.

The server 130 generates a first hash value using at least one of the certificate 122, NONCE-S 124, and NONCE-B 116 and sends the first hash value to the browser 110. For example, the server 130 determines the first hash value (A) using a hash function 132, an example of which can be represented as:

$$\text{Hash}(X | S | B) = A, \qquad (1)$$

where X represents the certificate 122, S represents NONCE-S 124, and B represents NONCE-B 116. In some examples, X is a string representing the certificate 122, S is a string of NONCE-S 124, and B is a string of NONCE-B 116. The strings X, S, and B can be concatenated in any suitable order, and the result is hashed. Examples of the hash function 132 include SHA256, SHA512, CRC, MD, Keccack, and so on.

The server 120 an send the browser information 112 identifying the browser 110, the certificate 122, and the NONCE-S 124 to the server 130 via a suitable network or connection to be stored in a suitable memory device or database. In response to receiving the NONCE-B 116 (and accompanying browser information 112) from the browser 110 over the network 105, the server 130 determines the certificate 122 and the NONCE-S 124 corresponding to the browser information 112 and returns a hash computed over the certificate 122, the NONCE-S 124, and NONCE-B 116 to the browser 110 over the network 105.

For example, the browser 110 (e.g., the browser script thereof) generates a second hash value using at least one of the certificate 122, NONCE-S 124, and NONCE-B. For example, the browser 110 determines the second hash value (A') using a hash function 118, an example of which can be represented as:

$$\text{Hash}(X | S | B) = A', \qquad (2)$$

where X represents the certificate 122, S represents NONCE-S 124, and B represents NONCE-B 116. In some examples, X is a string representing the certificate 122, S is a string of NONCE-S 124, and B is a string of NONCE-B 116. The strings X, S, and B can be concatenated in any suitable order, and the result is hashed. The order in which the strings X, S, and B is concatenated for the hash function 118 is the same order in which the strings X, S, and B is concatenated for the hash function 132. Examples of the hash function 118 include SHA256, SHA512, CRC, MD, Keccack, and so on. The hash functions 118 and 132 are the same.

The browser 110 compares the first hash value A received from the server 130 against the second hash value A'. In response to determining that these values are the same, e.g., A=A', the browser 110 can trust the certificate 122. For example, the browser 110 can perform certificate chain validation, after which the browser 110 can trust the certificate 122 for the TLS Handshake between the browser 110 and the server 120.

In some examples, the server 120 sends only a valid certificate 122 to the browser 110 such that the certificate 122 is not expired, is not revoked, etc. The browser 110 only uses the proffered certificate 122 once per session (e.g., a TLS session) to protect sensitive data and never stores the certificate 122 on the local computing system running the browser 110.

Figure 2:
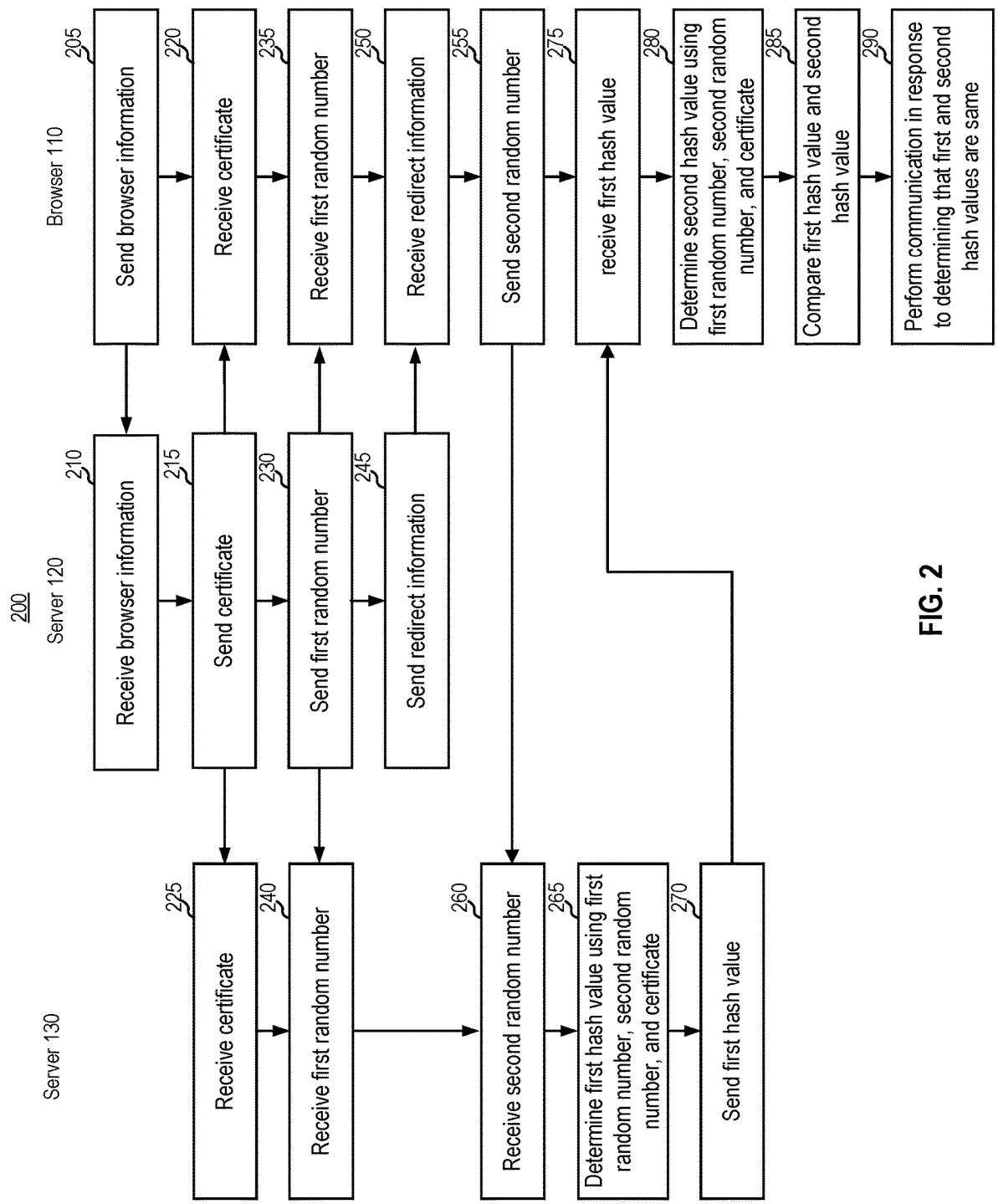
FIG. 2 is a flowchart diagram illustrating a method for delivering a server public key certificate of the server to the browser, according to various arrangements.

FIG. 2 is a flowchart diagram illustrating a method 200 for delivering a server public key certificate of the server 120 to the browser 110, according to various arrangements. The method 200 can be performed by the browser 110 (e.g., a browser script), the server 120 (e.g., a first server), and the server 130 (e.g., a second server). The method 100 is an example implementation of the method 200.

At 205, the browser 110 sends the browser information 112 to the server 120. At 210, the server 120 receives the browser information 112 from the browser 110. At 215, the server 120 sends the certificate 122 to the browser 110 and to the server 130. The browser 110 receives the certificate 122 from the server 120 at 220. The server 130 receives the certificate 122 from the server 120 at 225. At 230, the server 120 sends a first random number (e.g., NONCE-S 124) to the browser 110 and the server 130. The browser 110 receives the first random number from the server 120 at 235. The server 130 receives the first random number from the server 120 at 240. At 245, the server 120 sends the redirect information 126 to the browser 110, and the browser 110 receives the redirect information 126 at 250. In some arrangements, the certificate 122, the first random number, and the redirect information 126 is sent by the server 120 and received by the browser 110 in response to the browser 110 sending the browser information 112 or the server 120 receiving the browser information 112. In some arrangements, the redirect information 126 includes an ID of the second server 130.

At 255, the browser 110 sends a second random number (e.g., NONCE-B 116) to the server 130. The second random number is sent to the second server using or according to the ID of the second server 130. At 260, the server 130 receives the second random number from the browser 110. At 265, the server 130 determines the first hash value (e.g., A) using the first random number, the second random number, and the certificate 122. At 270, the server 130 sends the first hash value to the browser 110, and the browser 110 receives the first hash value at 275. At 280, the browser 110 determines the second hash value (e.g., A') using the first random number, the second random number, and the certificate 122. At 285, the browser 110 compares the first hash value and the second hash value. At 290, the browser 110 performs communication with the server 120 in response to determining that the first hash value and the second hash value are the same.

In some examples, performing communication with the server 120 includes performing certificate chain validation for the certificate in response to determining that the first hash value and the second hash value are the same and establishing a TLS connection between the browser 110 and the server 120 in response to validating the certificate through the certificate chain validation.

In some examples, the first hash value is generated by the server 130 by running the first random number, the second random number, and the certificate through a first hash function 132. In some examples, the second hash value is generated by the browser 110 by running the first random number, the second random number, and the certificate through a second hash function 118. The first hash function and the second hash function are the same. In some examples, the first hash value is generated using a string of the first random number, a string of the second random number, and a string of the certificate. In some examples, the second hash value is generated using the string of the first random number, the string of the second random number, and the string of the certificate. In some examples, the first hash value is generated by running a first value through a first hash function, the first value is generated by concatenating the string of the first random number, the string of the second random number, and the string of the certificate. In some examples, the second hash value is generated by running a second value through a second hash function, the second value is generated by concatenating the string of the first random number, the string of the second random number, and the string of the certificate.

Figure 3:
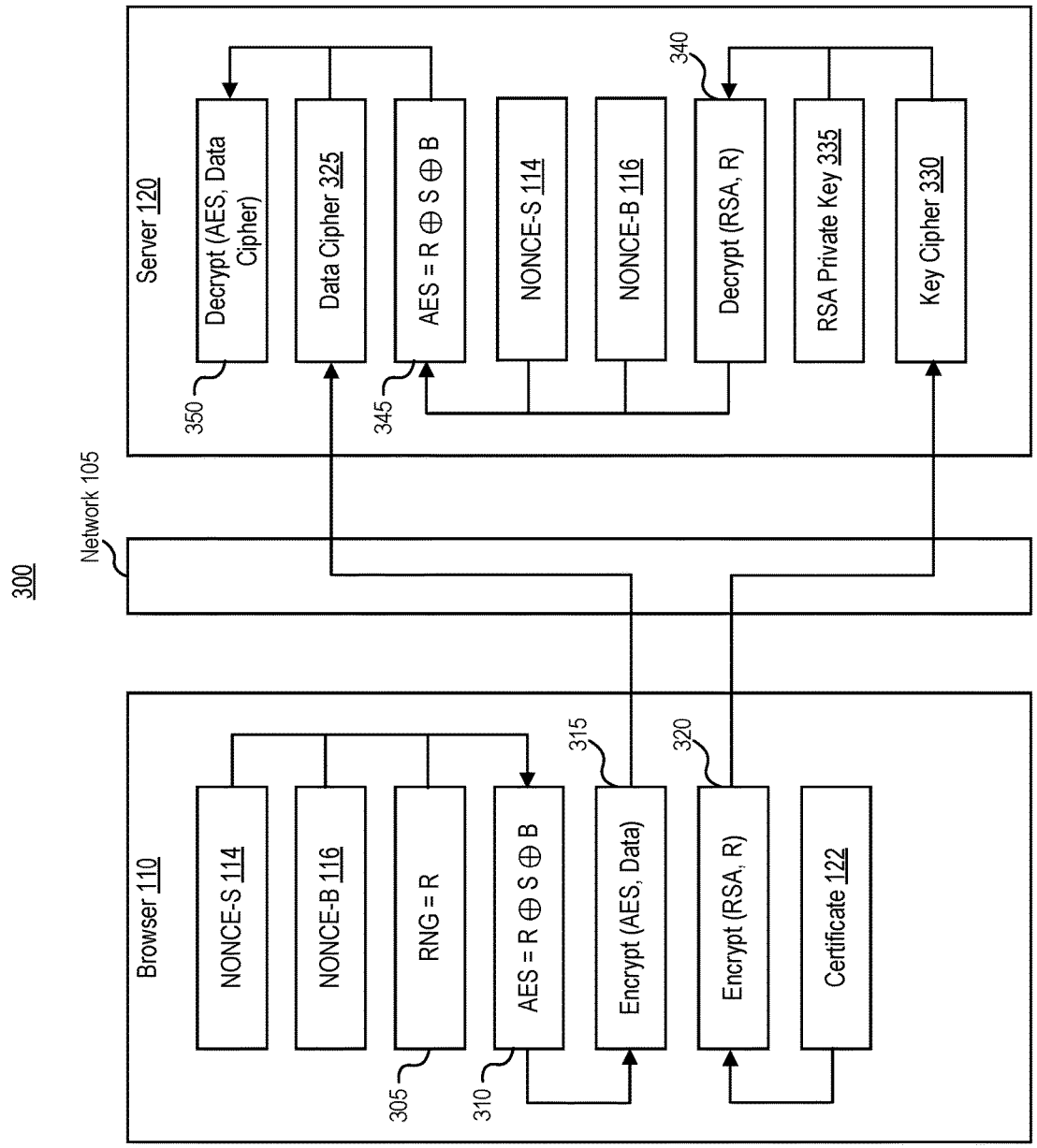
FIG. 3 is a schematic diagram illustrating an example method for delivery sensitive data encrypted by the browser to the server, according to various arrangements.

FIG. 3 is a schematic diagram illustrating an example method 300 for delivery sensitive data encrypted by the browser 110 to the server 120, according to various arrangements. The method 300 can be performed by the browser 110 (e.g., a browser script) and the server 120 over the network 105. In some examples, communications between the browser 110 and the server 120 at 290 can include the method 300. That is, the method 300 can be performed after the methods 100 and 200 are completed and the certificate 122 is validated.

At 305, the browser 110 generates a random number (R) using a Random Number Generator (RNG). At 310, the browser 110 derives an encryption key. For example, the NONCE-S 114, NONCE-B 116, and the random number R can be combined such as using Exclusive Or (XOR), including bitwise XOR, e.g., R⊕S⊕B. The result is passed through a key derivation function such as an Advanced Encryption Standard (AES) algorithm. The resulting encryption key (denoted as AES) can be an AES-256 encryption key. Other key derivation functions can be likewise implemented.

At 315, the browser 110 encrypts data using the encryption key AES and the AES algorithm. The data can be sensitive data such as a name, address, phone number, email address, payment information, payment number, Personal Identification Number (PIN), Personally Identifiable Information (PII), social security number, and so on. The output of the encryption process is referred to as a data cipher 325.

The browser 110 sends the data cipher 325 to the server 120 over the network 105. In some examples, the browser 110 can send the data cipher 325 via TLS protocol. That is, the browser 110 can further encrypt the data cipher 325 using an encryption scheme of the TLS. For example, the browser 110 can encrypt each of at least one data packet containing the data cipher 325 using a TLS session key established during TLS handshake, to generated encrypted data packet TLS (packet (data cipher)), which is sent by the browser 110 to the server 120. The server 120 can decrypted the TLS-encrypted data packet using a established TLS session key established during TLS handshake to uncover the data cipher 325. In the examples in which the TLS encryption scheme is symmetric, the session key used to encrypt the data cipher packet and the session key used to decrypt the encrypted data cipher packet are the same. In the examples in which the TLS encryption scheme is asymmetric, the session key used to encrypt the data cipher packet and the session key used to decrypt the encrypted data cipher packet are different. Accordingly, the sensitive data can be doubly encrypted.

At 320, the browser 110 encrypts the random number R using the certificate 122. For example, the browser 110 can encrypt the random number R using a public key (e.g., an RSA public key contained in the certificate 122). The output of the encryption process, which is the encrypted random number, is referred to as a key cipher 330. The browser 110 sends the key cipher 330 to the server 120 over the network 105. The browser 110 transports the random key to the server 120 using the certificate 122 of the server 120. In some examples, a random number R can be generated for each sensitive data to be transported from the browser 110 to the server 120. Although RSA is used as an example for protecting the random number R to be transported from the browser 110 to the server 120 via the network, other encryption algorithms such other asymmetric encryption algorithms (e.g., Diffie-Hellman (DH), Elliptic Curve Cryptography (ECC), and so on) and symmetric algorithms (e.g., Post-Quantum Cryptography (PQC)) can be likewise implemented for the functions 320 and 340.

The server 120 can authenticate the key cipher 330 and the data cipher 325 to recover the sensitive data. For example, at 340, the server 120 can use a private key such as an RSA private key 335 to decrypt the key cipher 330 using a decrypt function 340 to recover the random number R. The RSA private key 335 corresponds to the RSA public key included in the certificate 122. In other words, the RSA private key 335 and the RSA public key included in the certificate 122 are a public-private key pair.

At 345, the server 120 recreates the encryption key, denoted as AES. For example, the NONCE-S 114, NONCE-B 116, and the random number R can be combined such as using XOR, e.g., R⊕S⊕B. The result is passed through a key derivation function such as an AES algorithm. The resulting encryption key (AES) can be an AES-256 encryption key and is the same as the AES encryption key created at 310. Another key derivation function that is the same as the key derivation function used in 310 can be likewise implemented.

At 350, the server 120 decrypts the data cipher 325 using the encryption key AES and the AES algorithm to recover the sensitive data, which is encrypted at 315. Accordingly, the server 120 recovered the sensitive data using the NONCE-S 114 and NONCE-B 116 previously exchanged in methods 100 and 200 and the exchanged random number R. R is protected using the certificate 122 of the server 120. An attacker would not have access to the private key (e.g., the RSA private key 335) of the server 120. The private key of the server 120 can be used within the cryptographic boundary of a Hardware Security Module (HSM). Therefore, an attacker cannot determine the random number R. Likewise, an attacker should not have access to both NONCE values 114 and 116, generated by the server 120 and the browser 110 respectively, with a reasonable level of assurance.

Figure 4:
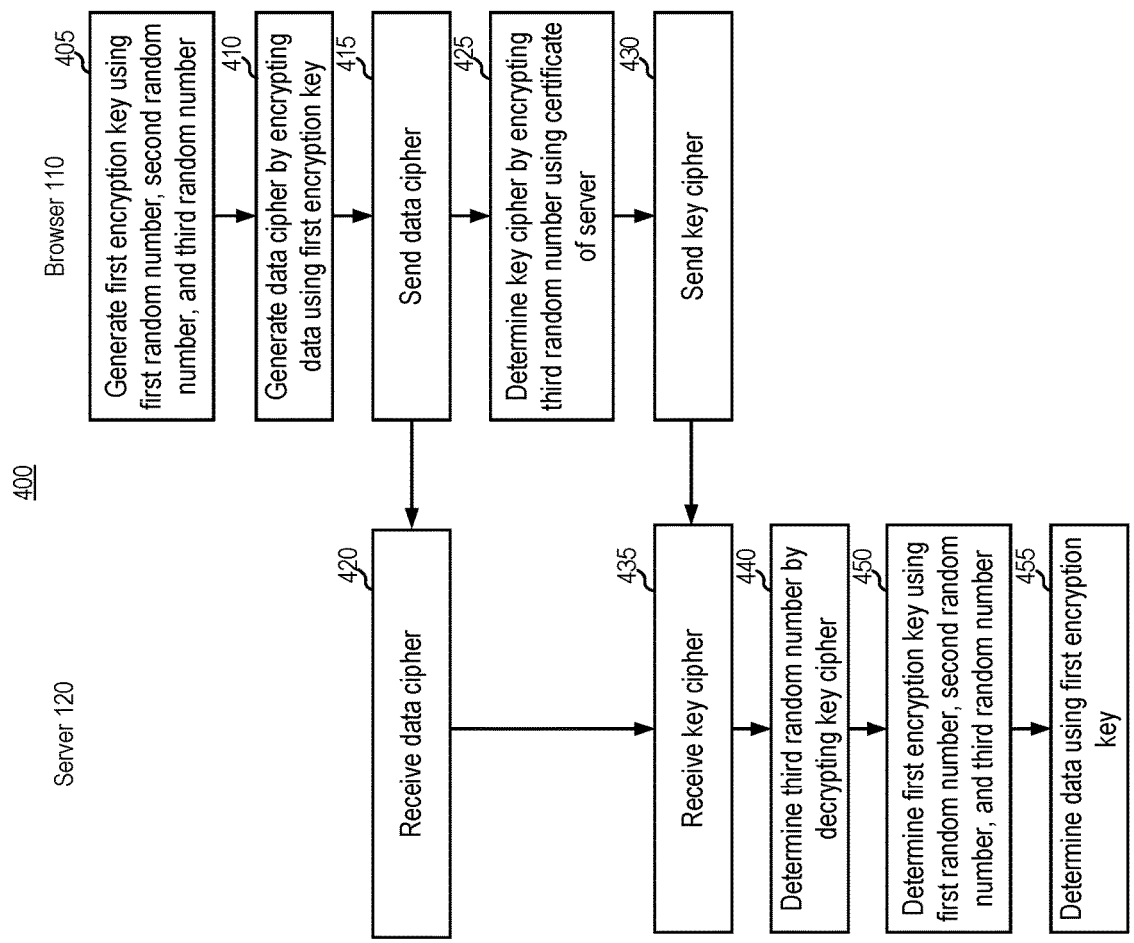
FIG. 4 is a flowchart diagram illustrating a method for delivering sensitive data encrypted by the browser to the server, according to various arrangements.

FIG. 4 is a flowchart diagram illustrating a method 400 for delivery sensitive data encrypted by the browser 110 to the server 120, according to various arrangements. The method 400 can be performed by the browser 110 (e.g., a browser script) and the server 120. The method 300 is an example implementation of the method 400.

At 405, the browser 110 generates the first encryption key (e.g., AES) using a first random number (e.g., NONCE-S 114), a second random number (e.g., NONCE-B 116), and a third random number (e.g., R). In some examples, the first encryption key is generated by combining the first random number, the second random number, and the third random number using XOR. At 410, the browser 110 generates the data cipher 325 by encrypting data (e.g., the sensitive data) using the first encryption key. At 415, the browser 110 sends the data cipher 325 to the server 120. At 420, the server 120 receives the data cipher 325 from the browser 110. In some examples, the data cipher 325 can be sent via TLS protocol. That is, the data cipher 325 can be further encrypted using any suitable encryption scheme of the TLS. For example, at least one data packet containing the data cipher 325 can be encrypted using a first TLS session key established during TLS handshake, to generated encrypted data packet TLS (packet (data cipher)), which is sent by the browser 110 to the server 120. The server 120 can decrypted the TLS-encrypted data packet using a second TLS session key established during TLS handshake to uncover the data cipher 325. In some examples, the first and second TLS session keys are the same. In other examples, the first and second TLS session keys are different.

At 425, the browser 110 determines the key cipher 330 by encrypting the third random number using the certificate 122 of the server 120. The certificate of the server 120 includes a second encryption key (e.g., RSA public key). Encrypting the third random number using the certificate includes encrypting the third random number using the second encryption key. The public key of the server 120 corresponds to a private key (e.g., the RSA private key 335) of the server 120 that is used by the server 120 to decrypt the key cipher 330.

At 430, the browser 110 sends the key cipher 330 to the server 120. At 435, the server 120 receives the key cipher 330 from the browser 110. At 440, the server 120 determines the third random number by decrypting the key cipher 330. At 450, the server 120 determines the first encryption key using the first random number, the second random number, and the third random number. At 455, the server 120 determines the data using the first encryption key.

Unlike smartphones on which applications with embedded certificates can be installed for handling sensitive data, browsers (e.g., the browser 110) do not have such capabilities. Further, browser scripts do not have access to the system key stores and complex processing needed for certificate validation. Browser authentication is therefore problematic. Handling sensitive data using end-to-end encryption is not available when relying solely on point-to-point security protocols such as TLS. The arrangements disclosed herein address such issues.

Figure 5:
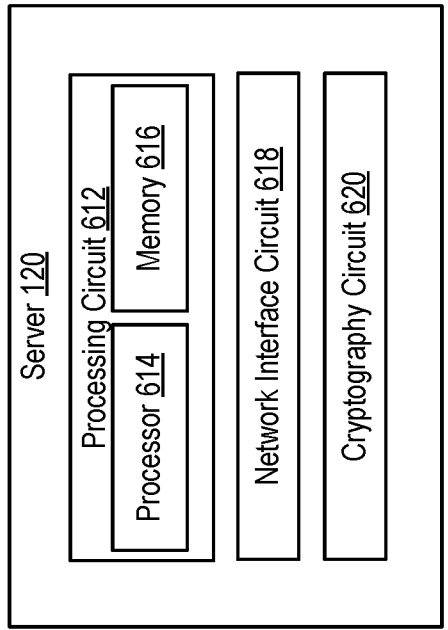
FIG. 5 is a block diagram of a computing system running the browser, according to some arrangements.

FIG. 5 is a block diagram of a computing system 500 running the browser 110, according to some arrangements. Examples of the computing system 500 include a mobile device, a smartphone, a laptop computer, a tablet, a desktop computer, a POS device, an ATM, a kiosk, a customer interaction device, and so on. The computing system 500 is shown to include various circuits and logic for implementing the operations described herein. More particularly, the computing system 500 includes one or more of a processing circuit 512, a network interface circuit 518, and a browser circuit 520. While various circuits, interfaces, and logic with particular functionality are shown, it should be understood that the computing system 500 includes any number of circuits, interfaces, and logic for facilitating the operations described herein. For example, the activities of multiple circuits are combined as a single circuit and implemented on a same processing circuit (e.g., the processing circuit 512), as additional circuits with additional functionality are included.

In some arrangements, the processing circuit 512 includes a processor 514 and a memory 516. The processor 514 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 516 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 516 is or includes tangible, non-transient volatile memory or non-volatile memory. Accordingly, the memory 516 includes database components, object code components, script components, or any other type of information structure for supporting the various activities and information structures described herein. The processing circuit 512 can be used to implemented one or more of the circuits 518 and 520.

The network interface circuit 518 is configured for and structured to establish a connection and communicate with the server 120 and the server 130 via the network 105 or another suitable wired, wireless, or physical connection. The network interface circuit 518 is structured for sending and receiving data over a communication network (e.g., the network 150) or a physical connection (e.g., via a physical connector such as Universal Serial Bus (USB)). Accordingly, the network interface circuit 518 includes any of a cellular transceiver (for cellular standards), wireless network transceiver (for 802.11X, ZigBee, Bluetooth, Wi-Fi, or the like), wired network interface, or a combination thereof. For example, the network interface circuit 518 may include wireless or wired network modems, ports, baseband processors, and associated software and firmware.

The browser circuit 520 is executed by the processing circuit 512 in some arrangements. The browser circuit 520 can run the browser 110 in the manner described herein. For example, the browser circuit 520 can run browser script (e.g., Java script, ASP, JSP, VBScrupt, and so on) to implement the functions of the browser 110. In some examples, the browser circuit 520 can be coupled to the network interface circuit 518 to send browser information 112 to the server 120, receive certificate 122, NONCE-S 124, and redirect information 126 from the server 120, send NONCE-B 116 to the server 130, receive the first hash value A from the server 130, send the data cipher 325 to the server 120, and send the key cipher 330 to the server 120. The browser circuit 520 can generate the NONCE-B 116 and the random number R. The browser circuit 520 can generate the first encryption key (AES) and encrypt sensitive data using the first encryption key. The browser circuit 520 can use the second encryption key (RSA public key) from the certificate 122 of the server 120 to encrypt the random number R.

Figure 6:
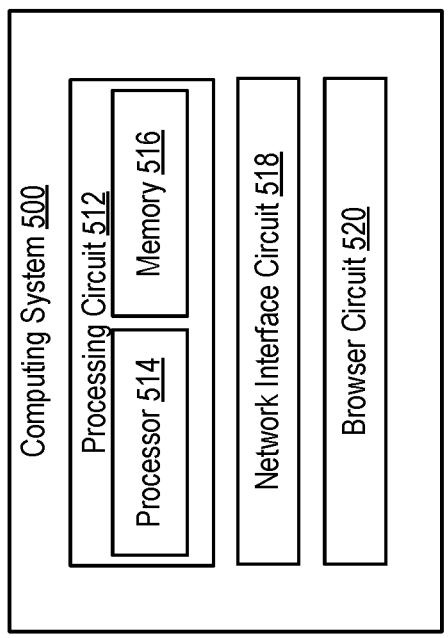
FIG. 6 is a block diagram of an example of the first server, according to some arrangements.

FIG. 6 is a block diagram of an example of the server 120 (e.g., the first server), according to some arrangements. The server 120 is shown to include various circuits and logic for implementing the operations described herein. More particularly, the server 120 includes one or more of a processing circuit 612, a network interface circuit 618, and a cryptography circuit 620. While various circuits, interfaces, and logic with particular functionality are shown, it should be understood that the server 120 includes any number of circuits, interfaces, and logic for facilitating the operations described herein. For example, the activities of multiple circuits are combined as a single circuit and implemented on a same processing circuit (e.g., the processing circuit 612), as additional circuits with additional functionality are included.

In some arrangements, the processing circuit 612 has a processor 614 and memory 616. The processor 614 is a processing component such as the processor 514. The memory 616 is a memory device such as the memory 516. The processing circuit 612 can be used to implemented one or more of the circuits 618 and 620.

The network interface circuit 618 is a network device such as the network interface circuit 518. The network interface circuit 618 is configured for and structured to establish a connection and communicate with the computing system 500 (e.g., the browser 110) via the network 150 or another suitable wired, wireless, or physical connection and with the server 130 via the network 150 or another suitable wired, wireless, or physical connection.

The cryptography circuit 620 can be implemented with the processing circuit 612 or a separate processing circuit similar to the processing circuit 612. In some arrangements, the cryptography circuit 620 can be coupled to the network interface circuit 618 to receive the browser information 112 from the browser 110, to send the certificate 122, the NONCE-S 124, and the redirect information 126 to the browser 110, to send the browser information 112, the certificate 122, and the NONCE-S 124 to the server 130, to receive NONCE-B 116 from the browser 110, to receive the data cipher 325 from the browser 110, and to receive the key cipher 330 from the browser 110. The cryptography circuit 620 can generate NONCE-S 124, determine the first hash value A, determine the random number R using the key cipher 330, and determine the data by decrypting the data cipher 325.

Figure 7:
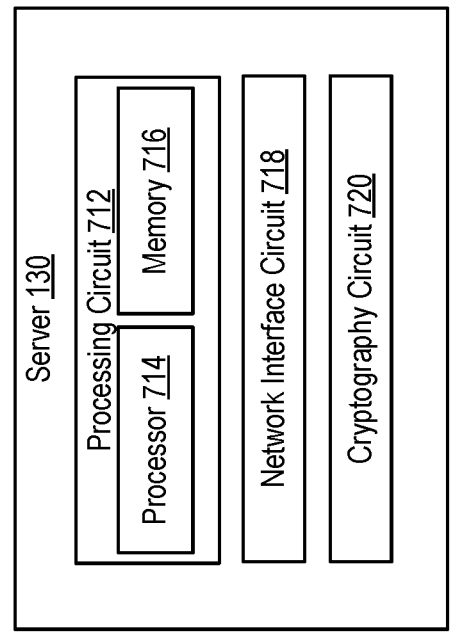
FIG. 7 is a block diagram of an example of the second server, according to some arrangements.

FIG. 7 is a block diagram of an example of the server 130 (e.g., the second server), according to some arrangements. The server 130 is shown to include various circuits and logic for implementing the operations described herein. More particularly, the server 130 includes one or more of a processing circuit 712, a network interface circuit 718, and a cryptography circuit 720. While various circuits, interfaces, and logic with particular functionality are shown, it should be understood that the server 130 includes any number of circuits, interfaces, and logic for facilitating the operations described herein. For example, the activities of multiple circuits are combined as a single circuit and implemented on a same processing circuit (e.g., the processing circuit 712), as additional circuits with additional functionality are included.

In some arrangements, the processing circuit 712 has a processor 714 and memory 716. The processor 714 is a processing component such as the processor 514 or 614. The memory 716 is a memory device such as the memory 516 or 616. The processing circuit 712 can be used to implemented one or more of the circuits 718 and 720.

The network interface circuit 718 is a network device such as the network interface circuit 518 or 618. The network interface circuit 718 is configured for and structured to establish a connection and communicate with the computing system 500 (e.g., the browser 110) via the network 150 or another suitable wired, wireless, or physical connection and with the server 120 via the network 150 or another suitable wired, wireless, or physical connection.

The cryptography circuit 720 can be implemented with the processing circuit 712 or a separate processing circuit similar to the processing circuit 712. In some arrangements, the cryptography circuit 720 can be coupled to the network interface circuit 718 to receive the NONCE-B 116 from the browser 110, to receive the browser information 112, the certificate 122, and the NONCE-S 124 from the server 120, send the first hash value A to the browser 110. The cryptography circuit 720 can determine the first hash value A.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
   receiving, by a browser from a first server, a certificate of the first server and a first random number;
   sending, by the browser to a second server, a second random number;
   receiving, by the browser from the second server, a first hash value generated by the second server using the first random number, the second random number, and the certificate;

determining, by the browser, a second hash value using the first random number, the second random number, and the certificate; and performing, by the browser, communication with the first server in response to determining that the first hash value and the second hash value are the same.

2. The method of claim 1, further comprising sending, by the browser to the first server, browser information of the browser, wherein the certificate and the first random number is received in response to sending the browser information.

3. The method of claim 1, further comprising receiving, by the browser from the first server, redirect information comprising an Identifier (ID) of the second server, wherein the second random number is sent to the second server using the ID of the second server.

4. The method of claim 1, wherein
the first random number is a first Random Number Used Once (NONCE) generated by the first server; and
the second random number is a second NONCE generated by the browser.

5. The method of claim 1, wherein
the first hash value is generated by the second server by running the first random number, the second random number, and the certificate through a first hash function;
generating the second hash value comprises running, by the browser, the first random number, the second random number, and the certificate through a second hash function; and
the first hash function and the second hash function are the same.

6. The method of claim 1, wherein
the first hash value is generated using a string of the first random number, a string of the second random number, and a string of the certificate; and
the second hash value is generated using the string of the first random number, the string of the second random number, and the string of the certificate.

7. The method of claim 6, wherein
the first hash value is generated by running a first value through a first hash function, the first value is generated by concatenating the string of the first random number, the string of the second random number, and the string of the certificate; and
the second hash value is generated by running a second value through a second hash function, the second value is generated by concatenating the string of the first random number, the string of the second random number, and the string of the certificate.

8. The method of claim 1, wherein the second server receives the certificate and the first random number from the first server.

9. The method of claim 1, wherein performing communication with the first server comprises:
performing certificate chain validation for the certificate in response to determining that the first hash value and the second hash value are the same; and
establishing a Transport Layer Security (TLS) connection between the browser and the first server in response to validating the certificate through the certificate chain validation.

10. A method, comprising:
determining, by a browser, data cipher by encrypting data using a first encryption key, the first encryption key is generated using a first random number, a second random number, and a third random number;

sending, by the browser to a server, the data cipher;
determining, by the browser, a key cipher by encrypting the third random number using a certificate of the server; and
sending, by the browser to the server, the key cipher.

11. The method of claim 10, wherein
the first random number is a first Random Number Used Once (NONCE) generated by the server; and
the second random number is a second NONCE generated by the browser.

12. The method of claim 10, wherein the first encryption key is generated by combining the first random number, the second random number, and the third random number using XOR.

13. The method of claim 10, wherein
the certificate of the server comprises a second encryption key; and
encrypting the third random number using the certificate comprises encrypting the third random number using the second encryption key.

14. The method of claim 13, wherein the second encryption key comprises a public key of the server, the public key of the server corresponds to a private key of the server that is used by the server to decrypt the key cipher.

15. The method of claim 10, further comprising encrypting, by the browser, the data cipher using a session key for a Transport Layer Security (TLS) session, wherein sending the data cipher to the server comprises sending the encrypted data cipher to the server, wherein the server decrypts the encrypted data cipher using the session key.

16. A method, comprising:
receiving, by a server from a browser, a data cipher and a key cipher, wherein the data cipher is generated by the browser by encrypting data using a first encryption key, the first encryption key is determined using a first random number, a second random number, and a third random number, and the key cipher is generated by the browser using a certificate of the server;
determining, by the server, the third random number by decrypting the key cipher;
determining, by the server, the first encryption key using the first random number, the second random number, and the third random number; and
determining, by the server, the data by decrypting the data cipher using the first encryption key.

17. The method of claim 16, wherein
the certificate of the server comprises a second encryption key; and
the key cipher is decrypted by the server using a third encryption key corresponding to the second encryption key.

18. The method of claim 17, wherein
the second encryption key comprises a public key of the server; and
the third encryption key comprises a private key of the server.

19. The method of claim 16, wherein the first encryption key is generated by combining the first random number, the second random number, and the third random number using XOR.

20. The method of claim 16, wherein
the first random number is a first Random Number Used Once (NONCE) generated by the server; and
the second random number is a second NONCE generated by the browser.

* * * * *